May 30, 1939.  J. FIEUX  2,160,202
RANGE-FINDING AND FIRE-CORRECTION SIGHTING DEVICE
Filed Dec. 23 1938   3 Sheets-Sheet 1

Inventor
Jean Fieux
By Cameron, Kerkam + Sutton
Attorneys

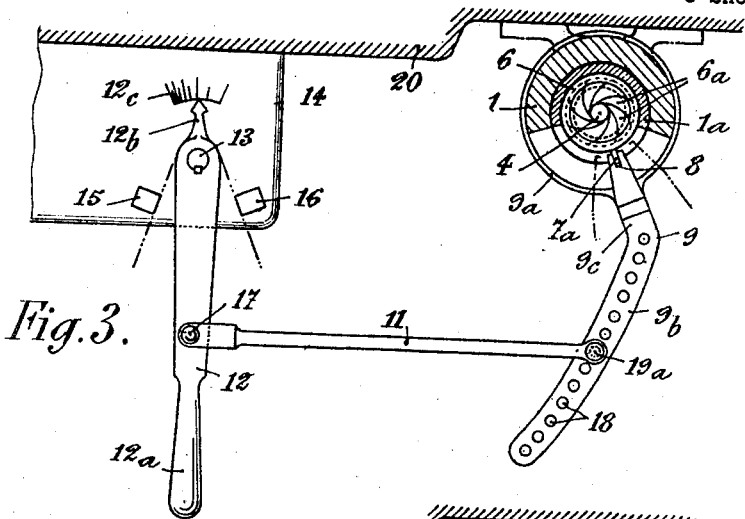

May 30, 1939.　　　　　J. FIEUX　　　　　2,160,202
RANGE-FINDING AND FIRE-CORRECTION SIGHTING DEVICE
Filed Dec. 23, 1938　　　3 Sheets-Sheet 3
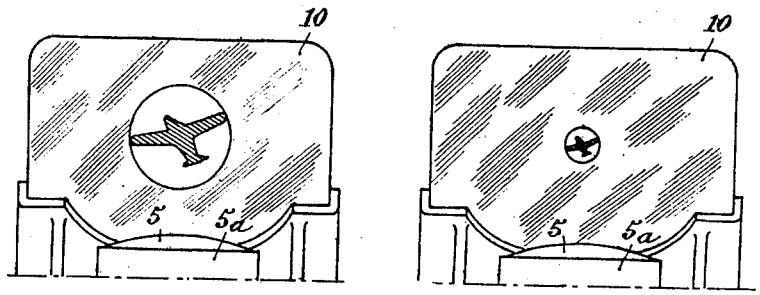
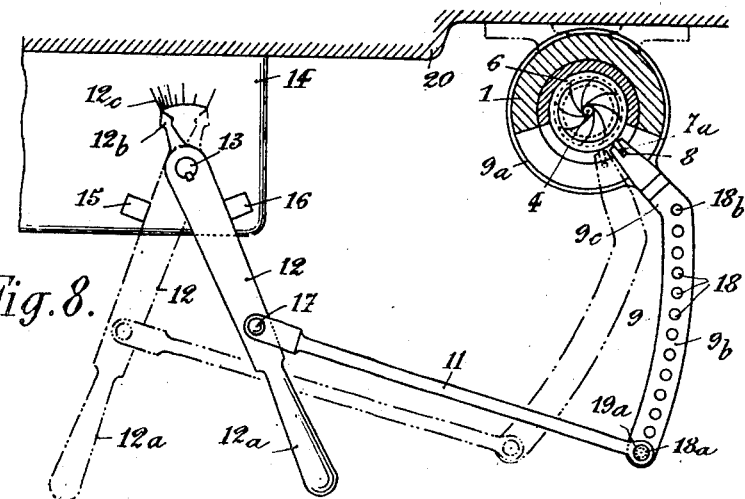
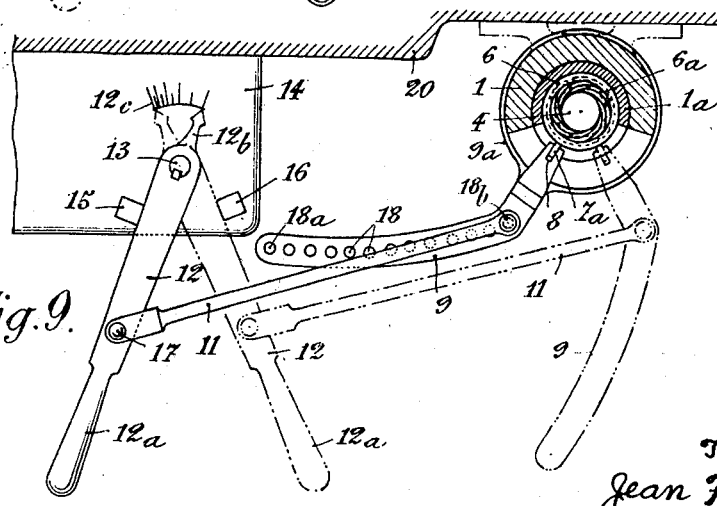
Inventor
Jean Fieux
By Cameron, Kerkam + Sutton
Attorneys Patented May 30, 1939

2,160,202

UNITED STATES PATENT OFFICE 2,160,202

RANGE-FINDING AND FIRE-CORRECTION SIGHTING DEVICE

Jean Fieux, Paris, France, assignor of one-half to Schneider & Cie, Paris, France, a joint-stock company of France Application December 23, 1938, Serial No. 247,506
In France October 15, 1937

5 Claims. (Cl. 88—2.3)

The present invention relates to a device by means of which it is possible by direct sighting to estimate in a particularly simple and yet sufficiently accurate manner from the practical point of view the distance at which an object of known dimensions is situated.

The device under consideration is, of course, capable of being used whenever an approximate estimation of the distance or range may be necessary while being sufficient, but it is particularly advantageous for the adjustment and correction of gun fire, for which purpose it is necessary, in aiming the gun, to take the range of the target into account.

In particular, it is extremely advantageous in the case of firing against aeroplanes effected from another aeroplane.

It may in fact, in accordance with what is set forth hereinafter, be adapted and combined with any other suitable additional fire adjusting devices, so that the estimation of the distance of the target does not complicate in any way the operations of the gunner, and so that the information obtained in so far as concerns the distance of the target may, without additional operation, be directly and automatically utilised for working out and applying the corrections to be introduced in the aim.

In the first place, the invention substantially comprises disposing in the focal plane of a transparent reflector sight of well-known type, in place of the usual cross-wires, an iris diaphragm, the opening of which is adapted to be varied at will by means of a suitable control device so that the image of said opening in the glass of the sight may be caused to circumscribe exactly the apparent contour of the object observed.

In addition, the invention relates to the arrangement and, if desired, the additional calibration of the aforesaid control device, in the first place with a view to adapting the latter to each of the different targets which it may be necessary to take into consideration (different types of aeroplanes, for example), and secondly, so that the said control device may, as desired, either simply furnish the indication of the distance to be estimated, in which case the variations in opening of the diaphragm will simply play as it were the part of stadiometer scale, the same scale being adapted by calibration to each type of target to be considered, or, preferably, introduce, as has been stated above, directly and automatically the range indication obtained into the auxiliary aim-correction mechanism by means of which the firing is adjusted.

For this latter case, the invention relates subsidiarily to a control device for varying the opening of the iris, said device comprising an adaptation lever of such a shape that the same angular movement of the correction control lever (which may be operated directly by the observer) produces, for each of the different targets which may occur, a variation of opening of the diaphragm, the origin and amplitude of which correspond, as a function of the dimensions of the target under consideration, to the common zone of fire selected, for example, 200 metres to 600 metres; that is to say, as the operation of the correction control lever, in the case of a target-aeroplane of wing-spread A, results in a diaphragm opening variation from M to N when the aeroplane passes from the distance 600 metres to the distance 200 metres, the same operation of the said correction control lever will, for the same change of distance from 600 metres to 200 metres of an aeroplane of wing-spread $a$, result in a variation in opening of the diaphragm from $p$ to $q$, $p$ being different from M, and $q-p$ being smaller than N—M if $a$ is smaller than A or larger if $a$ is larger than A.

Finally, by way of possible additional combination, the invention relates to such a combination which, as in the case where it is desired to leave the gun fixed relatively to the fuselage of the aeroplane, permits the adjustment of firing in the known manner by displacement of the axis of sight, although the means usually employed for this purpose, namely, the movement of the cross-wires in their own plane, is no longer available.

The additional combination referred to comprises rendering the objective of the transparent reflector sight movable in its own plane, due to which the parallax of aiming may, by means of a suitable control device connecting the objective to the correction mechanism, be corrected and regulated in the same way as in the known case where it is the cross-wires which are movable.

A particular embodiment of the invention is shown by way of example in the accompanying drawings and is described hereinafter, but of course this embodiment may be modified in its constructional details or may be completed by any useful accessory device without for that purpose departing from the scope of the invention.

In these drawings:

Figures 3, 4 and 5 show three plan views with partial section on the line III—III of Figure 1, all three of the said views corresponding to the case of firing at an aeroplane of average wing-spread and indicating the position of the control and adaptation members:

Figures 1, 2:
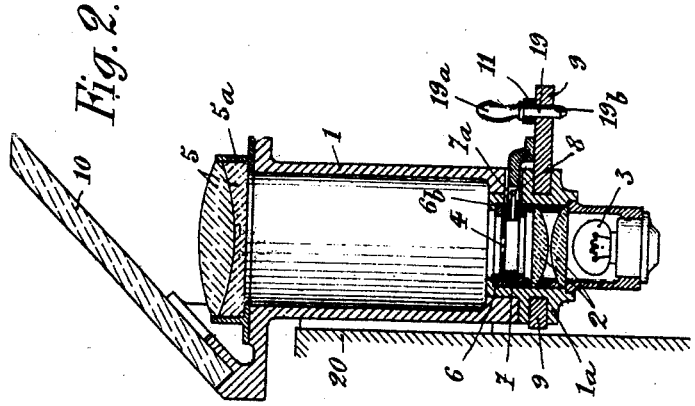
Figure 1 shows an elevation of the whole of the device.
Figure 2 shows a section on the line II—II of Figure 1.

(a) In the case of a range of fire in the vicinity of the mean range, (b) In the case of the minimum range of fire considered, and finally, (c) In the case of the maximum range of fire considered, it being possible furthermore to select all these ranges arbitrarily and to calibrate the apparatus in consequence.

Figures 6 and 7 show diagrammatically the images seen by the observer in the mirror of the sighting device, respectively, the first in the case of an aeroplane of average wing-spread, situated at the shortest range of fire considered, and the second in the case of the same aeroplane of average wing-spread situated at the maximum range of fire provided, the image seen by the observer in the same case of an aeroplane of mean wing-spread, situated at a range of fire in the vicinity of the mean range of fire, being indicated in Figure 1.

Figures 8 and 9 show two partially sectioned plan views, similar to Figures 3, 4 and 5, for explaining the manner in which the control mechanism employed enables the device to be adapted to various targets (aeroplanes, for example) of different dimensions.

As will be seen in these drawings, and more particularly in Figures 1, 2 and 3, the device shown substantially comprises a transparent reflector sight composed, in the usual manner, of a collimator body in two parts 1, 1a on which are mounted the usual light condenser 2, the source of light 3 (electric bulb, for example) and the objective 5.

In the present case, however, the transparent reflector sight comprises in addition, disposed in the focal plane of its objective 5, in place of the usual cross-wires, an iris diaphragm 4 which, in accordance with the usual art, is formed of a certain number of leaves 6a suitably pivoted in the interior of an annular mounting 6 (secured in the present case to the element 1a of the collimator body) and subjected to the action of a control ring 7.

The driving lug 7a of the latter itself projects through the annular mounting 6, which for this purpose is appropriately slotted at 6b, and engages a recess 8 of a control and adaptation lever 9 which is mounted by means of a circular strap 9a on the element 1a of the collimator body, around which it is consequently adapted to turn, driving with it the control ring 7 and producing, according to its direction of rotation, the opening or closing of the diaphragm.

Likewise fixed on the element 1 of the collimator body in accordance with the usual art is the clear glass plate 10 having parallel faces.

For reasons which will be indicated hereinafter, the adaptation lever 9 is not controlled directly but is set in movement through the medium of a link 11 carrying at one end a pin 19 by means of which it is pivoted to the lever 9, and pivoted at its other end to a pin 17 provided on an operating lever 12 which is pivotally mounted on a support 14.

The lever 12, as is appropriate, comprises at one of its ends an operating handle 12a and at its other end an indicating pointer 12b which moves over a graduated scale 12c marked on the said support 14.

The support 14 and the element 1 of the collimator body of the transparent reflector sight are both fixed to a common frame 20.

For limiting in desired manner the zone of use of the apparatus stops 15 and 16 are provided on the support 14 for preventing the lever 12 from exceeding the extreme positions imposed on it.

Upon simple inspection of Figures 1, 3, 4 and 5 on the one part and the supplementary Figures 6 and 7 on the other part, it will be appreciated that, according to the position which it is necessary to give to the lever 12 in order that the latter, through the medium of the link 11 and the adaptation lever 9, will impose on the iris diaphragm 4 an opening such that the image of said opening, seen by the observer at infinity through the transparent glass 10 exactly circumscribes the sighted target (aeroplane, for example), the range of the target under consideration will be immediately determined, at least in a sufficiently approximate manner for the usual practice of firing.

To render possible the adaptation of the device for the observation of a certain number of objects (aeroplanes) of different dimensions, the lever 9 is provided with a certain number of coupling holes 18, in each of which it is possible, as desired, by means of the operating knob 19a terminating its upper end, to insert the lower end 19b of the hinge pin 19 of the link 11; and in addition, the said lever 9 is made of such a shape that the same total movement of the operating lever 12 between its two stops 15, 16, corresponds to different opening starting points and opening amplitudes of the diaphragm, each adapted to each of the different targets (aeroplanes) which are expected to present themselves.

It is known in fact that, for the same variation in range, the variation of the angle at which an object is seen is determined according to a simple law which is a function of the dimensions of the said object.

If in fact the real diameter of the object is called D and its distance L, its apparent diameter $d$ will be:

$$d = \frac{D}{L}$$

and consequently the diameter of the opening A to be given to the diaphragm will be given by the formula:

$$A = k\frac{D}{L}$$

where $k$ is a coefficient which is easy to determine as a function of the optical elements of the device.

The shape of the adaptation lever 9 is likewise easy to determine, by means of a simple diagram, as a function of the dimensions of the objects which it is desired to take into consideration.

Of course, from the point of view of adaptation, the only useful part of said lever is the curved part, that is to say, the part 9b along which are provided the holes 18.

The bent connection 9c which connects the part 9b to the strap 9a is intended to allow for the fact that, practically, the orifice of an iris diaphragm, such as those which are constructed industrially, cannot be reduced to absolute zero.

The use of the adaptation device which has just been described and the result obtained are easy to understand by examining Figures 8 and 9.

If the smallest of the targets considered occurs, then in accordance with what is indicated in Figure 8, the pin 19 of the link 11 will be placed in the extreme hole 18a of the adaptation lever 9, and when the lever 12 passes from the position in which it is shown in solid lines to the position in which it is shown in chain lines, driving with it the link 11 and the adaptation lever 9, it produces a variation in opening of the diaphragm 4, the origin of which is in the vicinity of the smallest opening of the said diaphragm, and the amplitude of which is relatively restricted, the said variation corresponding to the law of approach of the target considered.

If, on the contrary, the largest of the targets which has been taken into consideration occurs, then in accordance with what is indicated in Figure 9, the pin 19 of the link 11 is inserted in the hole 18b which is closest to the sight, and at the same time as obtaining a suitable starting point for the opening of the diaphragm, different from those which would correspond to the other targets, there will likewise be obtained a much more considerable amplitude of variation of opening of the diaphragm adapted to the law of variation of parallax of the target considered as a function of the range of the latter.

When it is desired to utilise directly the range indication obtained for controlling the corresponding corrections, without even having to trouble about the numerical value of this range indication, the lever 12 is mounted and keyed on the shaft 13 of the automatic correction control mechanism, of which the support 14 may, for example, form the casing.

Under these conditions, the operation of the lever 12 will produce directly the correction corresponding to the range of the target sighted.

Finally, if necessary, a suitable displacement of the objective 5, which displacement may be produced by any adequate mechanism appropriately connecting the said objective to the correction mechanism, permits the firing to be adjusted by deviation of the line of sight, the gun being supposed to be fixed relatively to the fuselage of the aeroplane.

A lateral translation of the objective permits the correction in direction to be effected. Its translation parallel to the line of sight permits the correction in elevation to be effected.

There is thus provided, altogether, a sighting and correction device which allows for the distance of the target in an extremely simple manner without imposing on the user, whoever he may be, either observer or gunner, or observer-gunner if the two duties are carried out by one person, as is the case in single-seater aeroplanes, any additional effort of whatever nature.

The action exerted by the aimer on a single lever, for ensuring that the apparent image of the target will be inscribed exactly in the circle of light seen through the transparent reflector sight is in itself sufficient to obtain both a correct sight and a correct firing correction, allowing for the distance of the target.

I claim:

1. In a range-finder, the combination of a transparent member through which the target may be observed, means including a lens and an iris diaphragm disposed in the focal plane of said lens for producing an image of the opening of said diaphragm on said transparent member, control means for varying the size of the opening of said diaphragm, relatively movable scale and index-carrying members one of which is fixed relatively to said transparent member, a kinematic linkage connecting the other of said relatively movable members and said diaphragm control means, and means for varying the transmission ratio of said linkage.

2. In a range-finder, the combination of a transparent member through which the target may be observed, means including a lens and an iris diaphragm disposed in the focal plane of said lens for producing an image of the opening of said diaphragm on said transparent member, control means for varying the size of the opening of said diaphragm, relatively movable scale and index-carrying members, stops for limiting the amplitude of the relative movement of said members, one of said relatively movable members being fixed relatively to said transparent member, a kinematic linkage connecting the other of said relatively movable members and said diaphragm control means, and means for simultaneously varying the transmission ratio of said linkage and the position of said diaphragm control means corresponding to the mean relative position of said scale and index-carrying members.

3. In a range-finder, the combination of a transparent member through which the target may be observed, means including a lens and an iris diaphragm disposed in the focal plane of said lens for producing an image of the opening of said diaphragm on said transparent member, means including a control lever for varying the size of the opening of said diaphragm, an operating lever adapted to be manually actuated by the range-finder operator pivotally mounted for movement about an axis parallel to the axis of said lens and diaphragm and fixed relatively to said transparent member, a link connecting said operating lever and diaphragm control lever, and means for varying the point of connection between said link and said diaphragm control lever.

4. In a fire control system for guns, the combination of a transparent member through which the target may be observed, means including a lens and an iris diaphragm disposed in the focal plane of said lens for producing an image of the opening of said diaphragm on said transparent member, control means for varying the size of the opening of said diaphragm, means for introducing a range correction into said system, and an operative connection between said last named means and said diaphragm control means whereby the movements of the latter in varying the diaphragm opening are automatically transmitted to said range correction means.

5. In a fire control system for guns, the combination of a transparent member through which the target may be observed, means including a lens and an iris diaphragm disposed in the focal plane of said lens for producing an image of the opening of said diaphragm on said transparent member, control means for varying the size of the opening of said diaphragm, means including a member movable between predetermined limits for introducing a range correction into said system, a kinematic linkage connecting said last named member and said diaphragm control means, and means for simultaneously varying the transmission ratio of said linkage and the position of said diaphragm control means corresponding to the mean position of the movable member of said range correction means.

JEAN FIEUX.